US008071213B2

(12) United States Patent
Ikeyama et al.

(10) Patent No.: US 8,071,213 B2
(45) Date of Patent: Dec. 6, 2011

(54) RESIN COATED PISTON MANUFACTURING APPARATUS FOR SHOCK ABSORBER

(75) Inventors: Kunihiro Ikeyama, Gyoda (JP); Takeya Fujita, Gyoda (JP)

(73) Assignee: Showa Corporation, Gyoda-shi (JP)

( * ) Notice: Subject to any disclaimer, the term of this patent is extended or adjusted under 35 U.S.C. 154(b) by 1213 days.

(21) Appl. No.: 11/608,745

(22) Filed: Dec. 8, 2006

(65) Prior Publication Data
US 2007/0269547 A1    Nov. 22, 2007

(30) Foreign Application Priority Data

May 17, 2006   (JP) .................. 2006-138170

(51) Int. Cl.
*B29C 51/16* (2006.01)
(52) U.S. Cl. .......... 428/398; 425/90; 425/384; 425/393; 425/400; 425/521; 264/259; 264/271.1; 264/512; 264/549; 264/550
(58) Field of Classification Search .................. 425/107, 425/111, 112, 357, 358, 436 R, 438, 441, 425/DIG. 58, 90, 96, 384, 394, 398, 400, 425/520, 521, 526, 393; 92/155, 172, 192, 92/212, 240, 244, 245, 248, 249, 250, 253, 92/254; 277/240, 248, 250, 434, 453, 449, 277/923, 924, 946, 496; 29/888.04, 888.041, 29/888.042, 888.044, 888.048, 888.049; 264/138, 259, 308, 512, 550; 156/212, 229
See application file for complete search history.

(56) References Cited

U.S. PATENT DOCUMENTS

| | | | | |
|---|---|---|---|---|
| 1,860,488 A | * | 5/1932 | Whitehouse | 425/93 |
| 2,419,758 A | * | 4/1947 | Borkland | 156/85 |
| 2,425,390 A | * | 8/1947 | Palmer et al. | 264/153 |
| 3,121,767 A | * | 2/1964 | Welshon | 264/522 |
| 3,212,411 A | | 10/1965 | Storms | |
| 3,305,158 A | * | 2/1967 | Whiteford | 220/671 |
| 3,358,349 A | * | 12/1967 | Rosen | 29/888.048 |
| 3,499,188 A | * | 3/1970 | Johnson | 425/90 |

(Continued)

FOREIGN PATENT DOCUMENTS

JP    HEI 481074    4/1986

(Continued)

OTHER PUBLICATIONS

English translation for the prior art of JP 07-293696, printed on Jul. 26, 2010.*

*Primary Examiner* — Joseph Del Sole
*Assistant Examiner* — Seyed Masoud Malekzadeh
(74) *Attorney, Agent, or Firm* — Babcock IP, PLLC (57) ABSTRACT

A resin coated piston manufacturing apparatus for a shock absorber is provided with a means for pressing a piston raw material to a resin sheet until the resin sheet is locked to a resin sheet locking annular groove of the piston raw material in such a manner as to be capable of reciprocating on a center axis of a set mold. The apparatus having an aligning guide mateable with an inner diameter of the piston raw material set to a piston set hole of the set mold. The aligning guide presses the piston raw material to the resin sheet so as to lock the resin sheet to the resin sheet locking annular groove of the piston raw material, and can press the piston raw material to which the resin sheet is locked, to a heating and cooling cylinder apparatus.

7 Claims, 11 Drawing Sheets

U.S. PATENT DOCUMENTS

| | | | | |
|---|---|---|---|---|
| 3,546,746 | A | * | 12/1970 | Johnson .......................... 425/98 |
| 3,605,192 | A | * | 9/1971 | Edwards ......................... 425/143 |
| 3,837,782 | A | * | 9/1974 | Meissner et al. ............... 425/347 |
| 3,897,929 | A | * | 8/1975 | Hartmann ...................... 249/105 |
| 3,930,770 | A | * | 1/1976 | Gaudet et al. ................. 425/107 |
| 3,933,562 | A | * | 1/1976 | Cruckshank et al. .......... 156/250 |
| 3,953,273 | A | * | 4/1976 | Faller ............................. 156/224 |
| 3,964,856 | A | * | 6/1976 | Day ................................ 425/503 |
| 4,067,093 | A | * | 1/1978 | Schumacher et al. ... 29/888.047 |
| 4,239,727 | A | * | 12/1980 | Myers et al. ................... 264/550 |
| 4,404,162 | A | * | 9/1983 | Miki et al. ...................... 264/514 |
| 4,519,569 | A | * | 5/1985 | Nolan ............................. 249/142 |
| 4,610,332 | A | * | 9/1986 | Mourray .................... 188/322.15 |
| 4,728,477 | A | * | 3/1988 | Dromigny ...................... 264/509 |
| 5,034,077 | A | * | 7/1991 | Pata ................................ 156/84 |
| 5,225,027 | A | * | 7/1993 | Diekwisch .................... 156/382 |
| 5,345,860 | A | * | 9/1994 | Bowell ............................ 92/192 |
| 5,435,233 | A | * | 7/1995 | Bowell, Sr. ..................... 92/192 |
| 5,520,092 | A | * | 5/1996 | Iida et al. ........................ 92/240 |
| 5,525,290 | A | * | 6/1996 | Carpenter ...................... 264/510 |
| 5,588,350 | A | * | 12/1996 | Bowell, Sr. ..................... 92/192 |
| 5,611,260 | A | * | 3/1997 | Kanari et al. ................... 92/248 |
| 5,683,648 | A | * | 11/1997 | Fortin ............................. 264/550 |
| 5,785,160 | A | * | 7/1998 | Grundei .................... 188/322.15 |
| 5,794,517 | A | * | 8/1998 | Emig ............................... 92/244 |
| 6,250,910 | B1 | * | 6/2001 | Nimmergut et al. ........... 425/504 |
| 6,305,266 | B1 | * | 10/2001 | Jensen et al. .................... 92/248 |
| 6,327,963 | B1 | * | 12/2001 | Jensen et al. .................... 92/244 |
| 6,368,546 | B1 | * | 4/2002 | Sakamoto ...................... 264/553 |
| 6,591,948 | B2 | * | 7/2003 | Casellas et al. ........... 188/322.18 |
| 6,863,277 | B2 | * | 3/2005 | Wirth et al. .................... 277/434 |
| 6,928,923 | B2 | * | 8/2005 | May ................................ 92/248 |
| 7,310,876 | B2 | * | 12/2007 | May et al. .................. 29/888.04 |
| 7,537,445 | B2 | * | 5/2009 | Lindsten et al. ............... 425/438 |
| 2002/0056368 | A1 | * | 5/2002 | May ................................ 92/248 |
| 2005/0167220 | A1 | * | 8/2005 | May et al. ................. 188/322.22 |

FOREIGN PATENT DOCUMENTS

| | | | |
|---|---|---|---|
| JP | 07-293696 | * | 11/1996 |
| JP | 3400080 | | 4/2003 |

\* cited by examiner

RESIN COATED PISTON MANUFACTURING APPARATUS FOR SHOCK ABSORBER

BACKGROUND OF THE INVENTION

1. Field of the Invention

The present invention relates to a resin coated piston manufacturing apparatus for a shock absorber in which a resin sheet such as a tetrafluoroethylene resin or the like is adhered to an outer periphery of a piston raw material, in order to improve a sealing performance, an abrasion resistance and a sliding performance of a piston used in a hydraulic shock absorber for a motor vehicle or the like.

2. Description of the Related Art

Japanese Patent No. 3400080 (patent document 1) discloses a structure which aims to manufacture a resin coated piston for a shock absorber having a good quality by securely adhering a resin sheet made of a thin and soft raw material to a piston raw material without damage.

The prior art is structured such that in a resin coated piston manufacturing apparatus for a shock absorber in which a washer-shaped resin sheet is adhered to an outer periphery of a cylindrical piston raw material having a plurality of annular grooves in an outer periphery, there is provided: a set mold in which a resin sheet set hole is open to an upper end portion, a means for setting the resin sheet within the resin sheet set hole of the set mold, a means for aligning and setting a cylindrical piston raw material on the resin sheet set to the set mold, a means for pressing the cylindrical piston raw material to the resin sheet until the resin sheet is locked to a resin sheet locking annular groove of the cylindrical piston raw material, and continuously arranged heating and cooling cylinders having reciprocating ram pressing the piston raw material to which the resin sheet is locked, wherein the resin sheet set hole open to the upper end portion of the set mold has an inner diameter which is slightly larger than an outer diameter of the washer-shaped resin sheet to be adhered, a concave portion having a larger inner diameter than an outer diameter of the piston raw material is formed in a lower side of the resin sheet set hole via a step portion, the step portion has a curved surface having a radius R of curvature, and an aligning guide to which an inner diameter of the piston raw material is capable of being fitted from a center of a lower concave portion is provided so as to extend to a center axis of the set mold.

Further, the prior art is structured such as to be provided with an injection jet holding a laminated body of the washer-shaped resin sheets having a center hole so as to move up and down along a vertical holding rod inserted to the center hole, and separating the top end resin from the resin sheet in a lower side thereof by injecting a gas in a tangential direction near the top portion of the laminated body, and a pressure reduction suction device adsorbing and holding the sheet in the top stage so as to set within the resin set hole of the set mold from the laminated body.

Further, in this prior art, the heating cylinder has an inlet end inner diameter D which is smaller than a dimension obtained by adding twice the thickness of the resin sheet to all outer diameter of the piston raw material, and an inner diameter E which is smaller than the inlet end inner diameter D from the inlet end via a taper portion. The cooling cylinder has an inner diameter equal to or less than the inner diameter of the heating cylinder, and is provided with a reciprocating plusher pressing the piston raw material to an upper end inlet of the heating cylinder from a resin sheet locking end portion so as to push forward at a predetermined press pitch.

Further, in this prior art, the structure is made such that a plurality of the set molds are provided on a turn table at spaced positions in a circumferential direction, the resin sheet set apparatus, the piston raw material set apparatus, the resin sheet locking apparatus and the heating and cooling cylinder apparatus are arranged around the turn table, and a control apparatus is provided in such a manner as to synchronously actuate the turn table, the resin sheet set apparatus, the piston raw material set apparatus, the resin sheet locking apparatus and the heating and cooling cylinder apparatus.

The prior art has the following problems.

(1) Since the cylindrical piston raw material is set on the resin sheet set to the set mold, it is necessary to be provided with the means for aligning and setting the piston raw material on the resin sheet, specifically, the aligning guide to which the inner diameter of the piston raw material can be fitted from the center of the lower concave portion of the set mold in an extending manner.

It is necessary to execute the operation of fitting the inner diameter of the piston raw material to the aligning guide during setting of the piston raw material into the set mold, complicating the piston raw material set apparatus.

(2) Since the cylindrical piston raw material is set on the resin sheet set to the set mold, it is impossible to simultaneously execute a step of setting the resin sheet to the set mold, and a step of setting the piston raw material to the set mold, extending the manufacturing time.

(3) Since the means (the pressing cylinder apparatus) for pressing the piston raw material to the resin sheet until the resin sheet is locked to the resin sheet locking annular groove of the piston raw material is separately formed from the reciprocating ram (the press cylinder apparatus) pressing the piston raw material to which the resin sheet is locked, two cylinder apparatuses are necessary, and the structure becomes complicated.

(4) Since the means (the pressing cylinder apparatus) for pressing the piston raw material to the resin sheet until the resin sheet is locked to the resin sheet locking annular groove of the piston raw material is separately formed from the reciprocating ram (the press cylinder apparatus) pressing the piston raw material to which the resin sheet is locked, the step of pressing the piston raw material by the pressing cylinder apparatus is discontinuous from the step of pressing the piston raw material by the press cylinder apparatus, and the manufacturing time becomes elongated.

(5) The structure is made such that the means for setting the resin sheet to the resin sheet set hole of the set mold is provided with the injection jet injecting the gas in the tangential direction near the top end portion of the laminated body of the resin sheet so as to separate the resin sheet in the top end from the resin sheet in the lower side thereof and the pressure reduction suction device adsorbing and holding the sheet in the top stage so as to set within the resin sheet set hole of the set mold from the laminated body. It is necessary to adjust an injection pressure of the injection jet, and it is hard to always accurately and stably separate only one resin sheet. Since the pressure reduction suction device is used, a pressure reduction generating means such as a vacuum pump or the like is necessary.

(6) Since the inner diameter of the cooling cylinder is made equal to or less than the inner diameter of the heating cylinder, the resin sheet adhered to the piston raw material is caught on a boundary between the heating cylinder and the cooling cylinder during pressing of the piston raw material. Because the resin sheet is locked to the cooling cylinder via the heating cylinder, it is impossible to smoothly press, and there is a risk that the resin sheet hot formed within the heating cylinder is damaged.

(7) Since the resin sheet set apparatus, the piston raw material set apparatus, the resin sheet locking apparatus and the heating and cooling cylinder apparatus are arranged around the turn table, and the respective apparatuses are synchronously actuated, the number of the steps is totally four, extending the manufacturing time, and the manufacturing apparatus is enlarged in size.

SUMMARY OF THE INVENTION

An object of the present invention is to simplify a piston raw material set apparatus, synchronize a set of a piston raw material to a set mold and a set of a resin sheet thereto, lock the resin sheet to a resin sheet locking annular groove of the piston raw material, and continuously execute an operation of pressing the piston raw material to which the resin sheet is locked to heating and cooling cylinders by a single piston raw material pressing means, in a resin coated piston manufacturing apparatus for a shock absorber, thereby intending to simplify the manufacturing apparatus and shorten a manufacturing time.

The other object of the present invention is to make a resin sheet set means capable of stably setting only one resin sheet to a set mold.

The other object of the present invention is to smoothly press the piston raw material to the cooling cylinder from the heating cylinder.

The other object of the present invention is to intend to make the manufacturing apparatus compact and shorten the manufacturing time.

The present invention relates to a resin coated piston manufacturing apparatus for a shock absorber in which a is washer-shaped resin sheet is adhered to an outer periphery of a cylindrical piston raw material having a plurality of annular grooves in an outer periphery, comprising: a set mold coaxially provided with a piston set hole and a resin sheet set hole; a means for setting the piston raw material within the piston set hole of the set mold; a means for setting the resin sheet within the resin sheet set hole of the set mold; a means for pressing the piston raw material to the resin sheet until the resin sheet is locked to a resin sheet locking annular groove of the piston raw material; and continuously arranged heating and cooling cylinder apparatuses in such a manner as to press the piston raw material to which the resin sheet is locked. The means for pressing the piston raw material is provided so as to freely reciprocate on a center axis of the set mold, is provided with an aligning guide capable of being fitted to an inner diameter of the piston raw material set to the piston set hole of the set mold, presses the piston raw material to the resin sheet so as to lock the resin sheet to the resin sheet locking annular groove of the piston raw material, and is capable of pressing the piston raw material to which the resin sheet is locked, to the heating and cooling cylinder apparatuses.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 5A to 5C show a resin sheet cutting device of the resin sheet set means, in which

DESCRIPTION OF THE PREFERRED EMBODIMENTS

Figure 11:
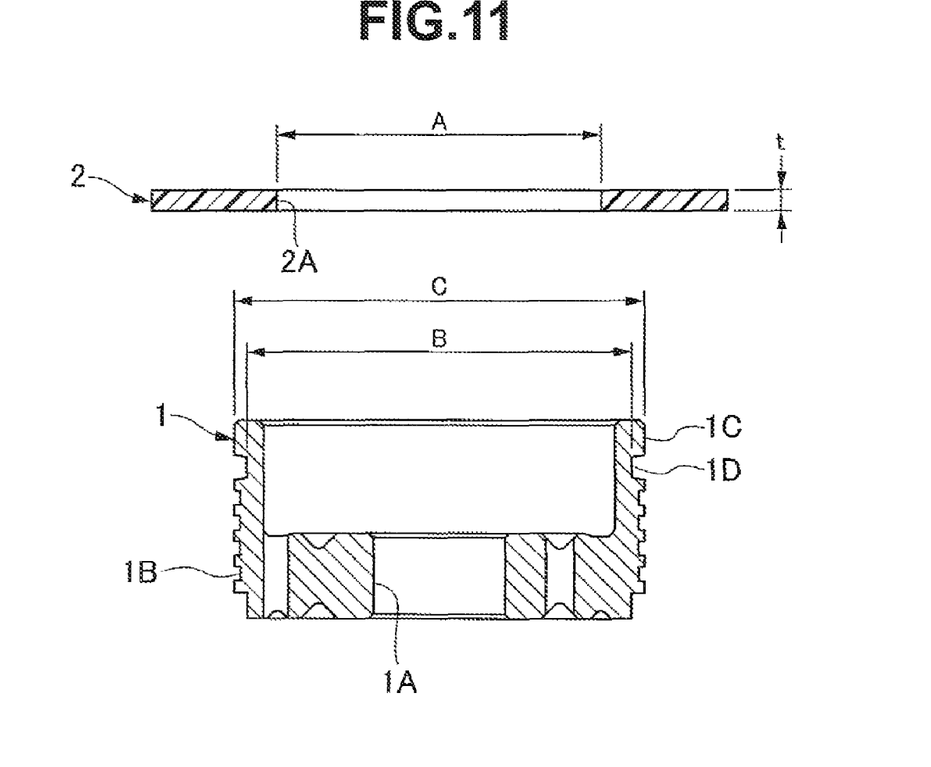
FIG. 11 is a cross sectional view showing a piston raw material and a resin sheet.

FIG. 11 shows one example of a piston raw material 1 and a resin sheet 2 constituting a resin coated piston for a shock absorber. The piston raw material 1 is formed in a cylindrical shape having a center hole 1A, and is provided with a plurality of annular grooves 1B in an outer periphery. The resin sheet 2 is constituted by a resin such as a tetrafluoroethylene or the like, and is formed in a flat (or conical) washer shape having a center hole 2A.

The resin sheet 2 is structured such that an inner diameter A of the center hole 2A is smaller than a pipe diameter B of an annular groove 1D in a resin sheet locking end portion 1C of the piston raw material 1, or equal thereto. Further, as mentioned below, a dimension obtained by adding twice of a thickness t of the resin sheet 2 to an outer diameter C of the piston raw material 1 is set to be larger than an inner diameter D of an inner end of a heating cylinder 61 used for crimping the resin sheet 2 to an outer periphery of the piston raw material 1.

Figure 3:
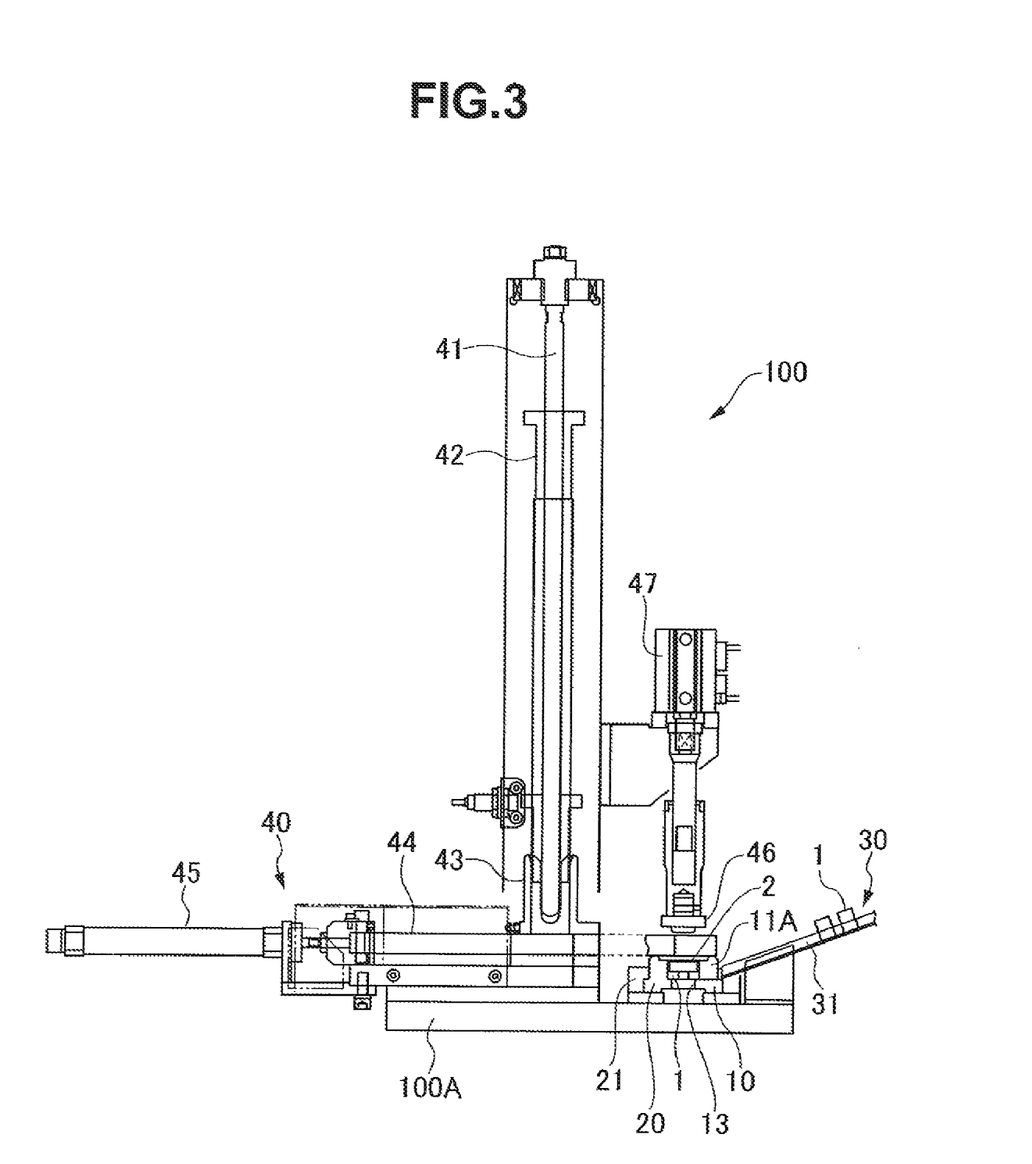
FIG. 3 is a schematic front elevational view showing a piston raw material set means and a resin sheet set means.
Figure 4:
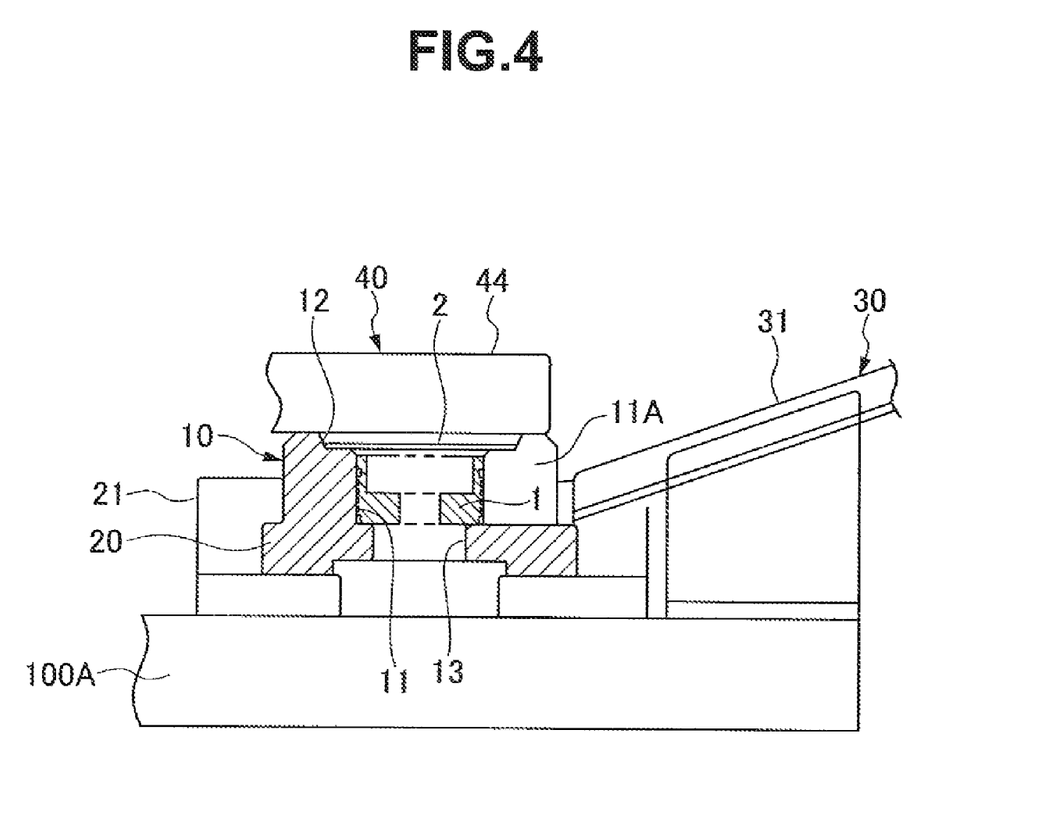
FIG. 4 is a cross sectional view showing a set mold.
Figure 7:
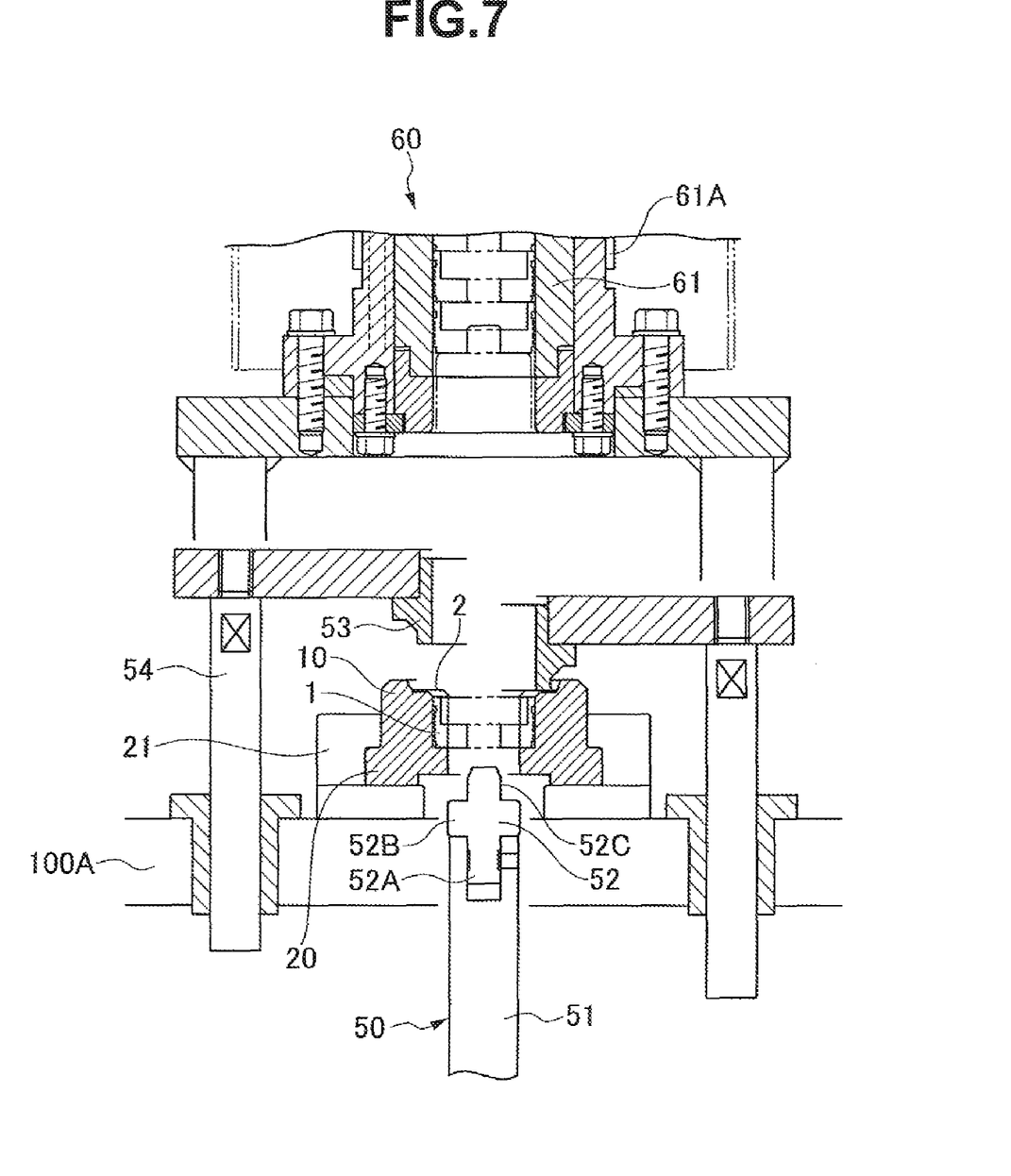
FIG. 7 is an enlarged view of a main portion of FIG. 6.

The piston raw material 1 and the resin sheet 2 mentioned above are set to a set mold 10. The set mold 10 is provided coaxially with a piston set hole 11 and a resin sheet set hole 12 in an upper portion of the piston set hole 11, as shown in FIG. 4. The piston set hole 11 has an inner diameter that is slightly larger than an outer diameter of the piston raw material 1, and can set the piston raw material 1 by a piston raw material set means 30. The resin sheet set hole 12 has an inner diameter which is slightly larger than an outer diameter of the resin sheet 2, and can set the resin sheet 2 by a resin sheet set means 40. In this case, the set mold 10 is provided with a lower opening 13 (FIG. 3) capable of inserting a pressing rod 51 and an aligning guide 52 of a piston raw material pressing means 50 (FIG. 7) from a lower side, in a lower portion of the piston set hole 11, and is provided with a side opening 14 (FIG. 1) capable of moving in an isolated manner in a horizontal direction with respect to the pressing rod 51 inserted from the lower opening 13.

In the piston raw material 1 set to the piston set hole 11 of the set mold 10, the aligning guide 52 of the piston raw material pressing means 50 is fitted to the center hole 1A.

Figure 12:
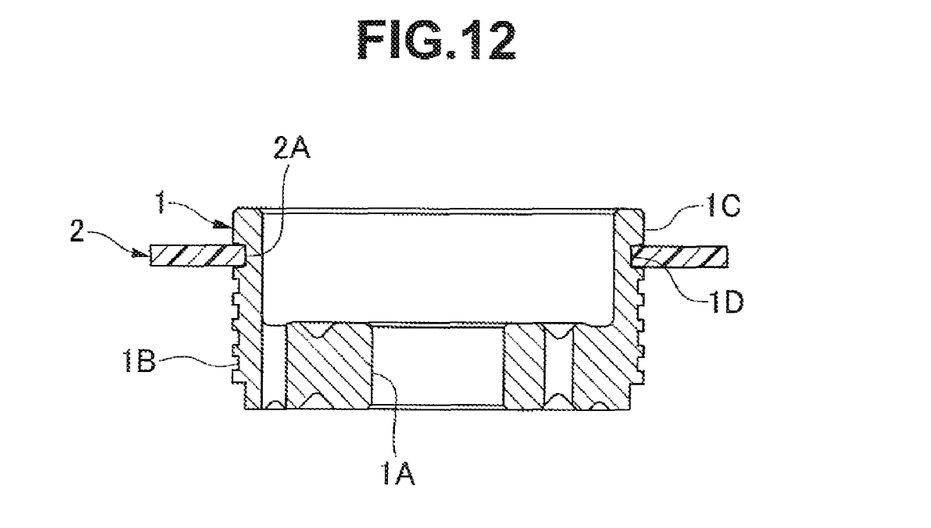
FIG. 12 is a cross sectional view showing a state in which the resin sheet is locked to a resin sheet locking annular groove of the piston raw material.

Further, the piston raw material 1 is pressed to the resin sheet 2 so as to lock the inner diameter of the resin sheet 2 to the annular groove 1D in the resin sheet locking end portion 1C of the piston raw material 1, by the piston raw material pressing means 50 (FIG. 12), and the piston raw material 1 to which the resin sheet 2 is locked is continuously pressed into the heating cylinder 61 and a cooling cylinder 62 of the heating and cooling cylinder apparatus 60. The heating cylinder 61 hot forms the resin sheet 2 in the outer periphery of the piston raw material 1, and pressure attaches the resin sheet 2 to the annular groove 1B in the outer periphery of the piston raw material 1. The cooling cylinder 62 cools and solidifies the resin sheet 2 crimped to the annular groove 1B in the outer periphery of the piston raw material 1 so as to fix, and a resin coated piston is extruded as a product from an upper end discharge port of the cooling cylinder 61.

Figure 1:
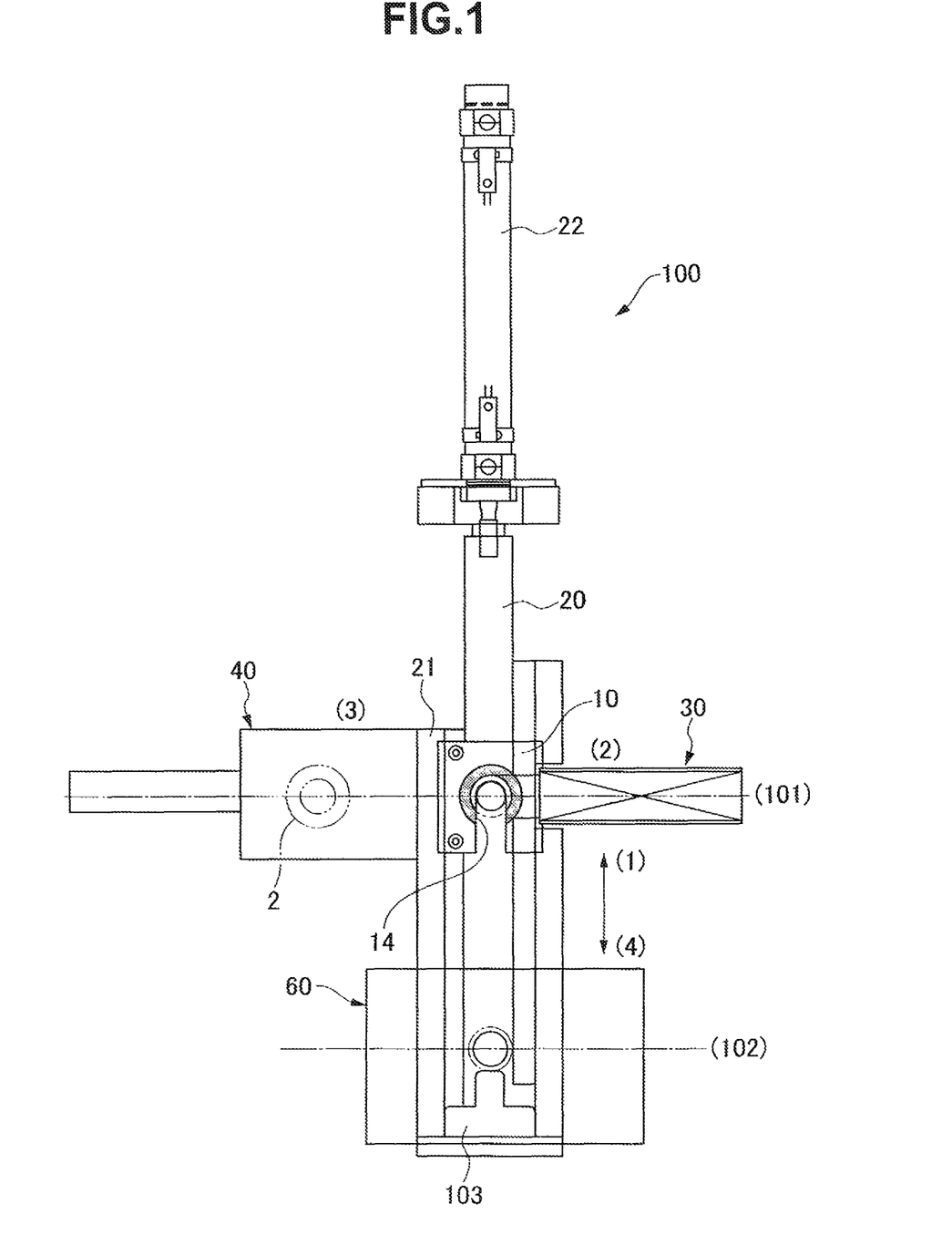
FIG. 1 is a schematic plan view showing a resin coated piston manufacturing apparatus.

A resin coated piston manufacturing apparatus 100 for a shock absorber is structured, as shown in FIG. 1, such that a slide table 20 to which the set mold 10 is fixed is supported to a slide guide 21, the set mold 10 is moved together with the slide table 20 by a slide cylinder 22 coupled to the slide table 20, and the set mold 10 is switched and set to each of a first station 101 and a second station 102 respectively installed at two positions along a moving path of the slide table 20. The slide guide 21 is supported to a pedestal 100A (FIG. 3). A piston raw material set means 30 is arranged in one side of the first station 101, and a resin sheet set means 40 is arranged in the other side of the first station 101. A piston raw material pressing means 50 and the heating and cooling cylinder apparatus 60 are coaxially arranged in upper and lower sides of the second station 102. In the second station 102, there is installed a stopper 103 within which a front end surface of the set mold 10 on the slide table 20 is brought into contact so as to position the set mold 10 at the second station 102. A control apparatus (not shown) actuates the slide table 20, the piston raw material set means 30, the resin sheet set means 40, the piston raw material pressing means 50 and the heating and cooling cylinder apparatus 60, and manufactures the resin coated piston from the piston raw material 1 and the resin sheet 2 set to the set mold 10.

Figure 2:
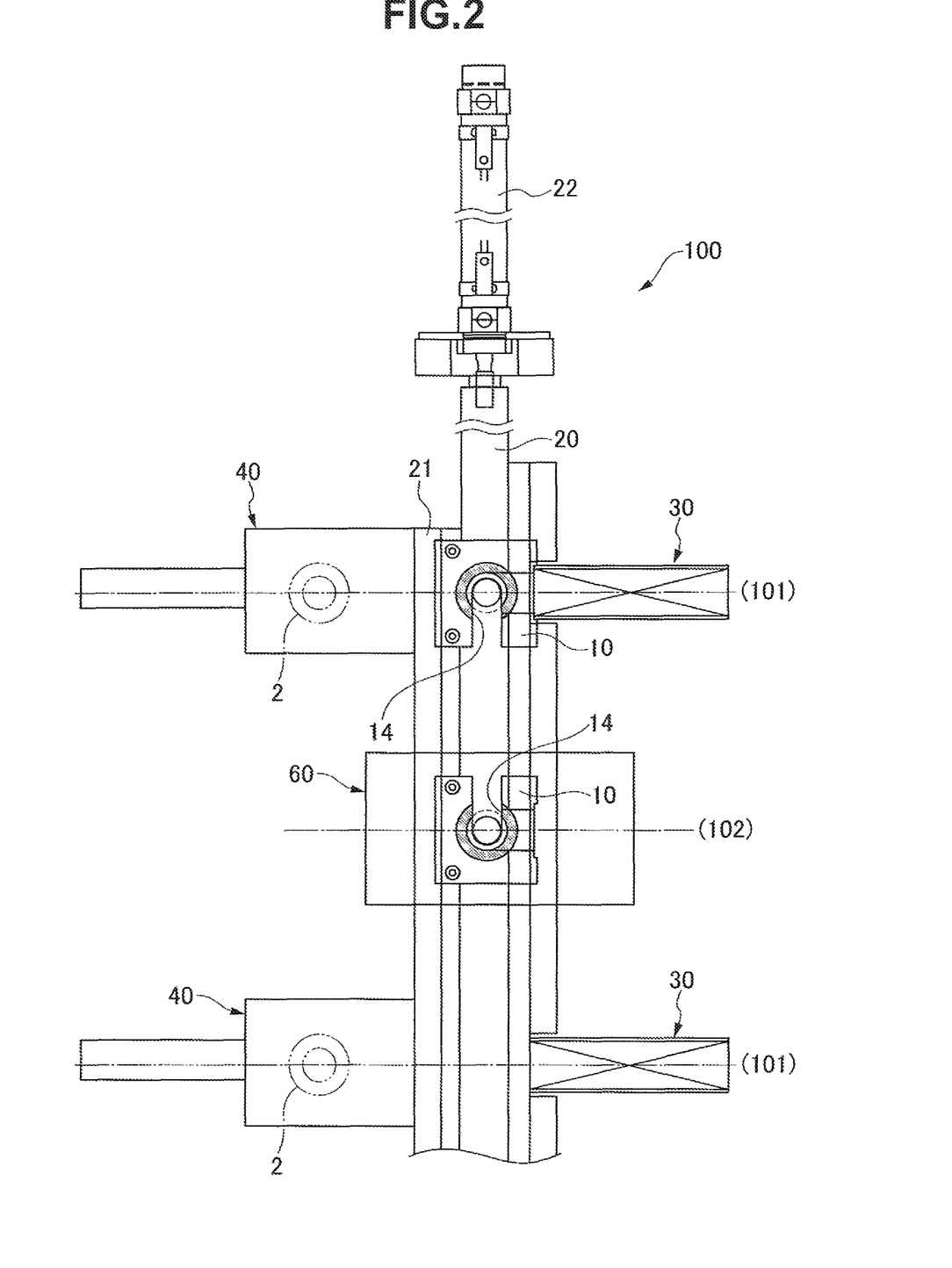
FIG. 2 is a schematic plan view showing a modification of the resin coated piston manufacturing apparatus.

The resin coated piston manufacturing apparatus 100 may be structured, as shown in FIG. 2, such that the first stations 101 and 101 are installed respectively at two positions spaced at an equal distance from the second station 102 on the moving path of the slide table 20, and the set molds 10 and 10 are fixed respectively to two positions along the moving path of the slide table 20 on the slide table 20 and spaced at the distance between each of the first stations 101 ad the second station 102. The resin coated pistons are alternately manufactured from the piston raw materials 1 and the resin sheets 2 set to the respective set molds 10.

The piston raw material set means 30 sets the piston raw material 1 to the piston set hole 11 of the set mold 10. The piston raw material set means 30 is provided with a piston input chute 31 in one side of the first station 101, and slope decline ends of the piston input chute 31 are arranged in a facing manner in a piston input port 11A formed by notching a side portion in one side of the piston set hole 11 in the set mold 10 positioned in the first station 101, as shown in FIGS. 1 to 4. The piston input chute 31 is supported to a pedestal 100A. Each time when the set mold 10 is positioned in the first station 101, the piston raw material 1 slipping down from the piston input chute 31 is input to the piston set hole 11 via the piston input port 11A.

Figure 5A:
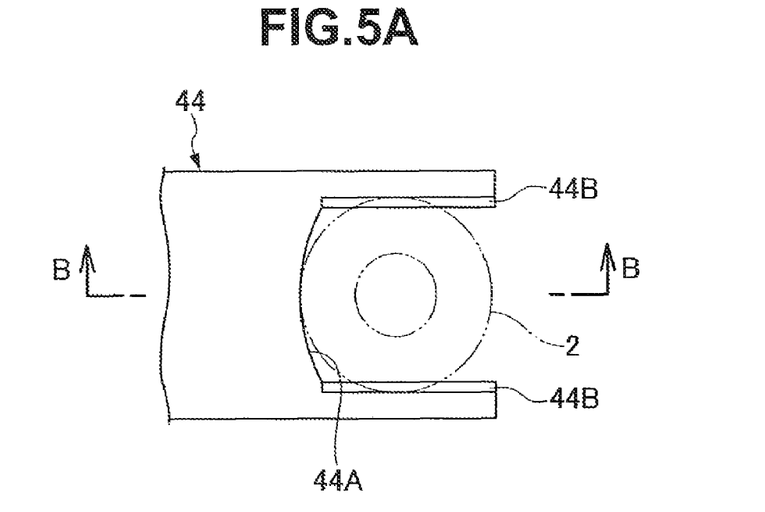
FIG. 5A is a plan view.
Figure 5B:
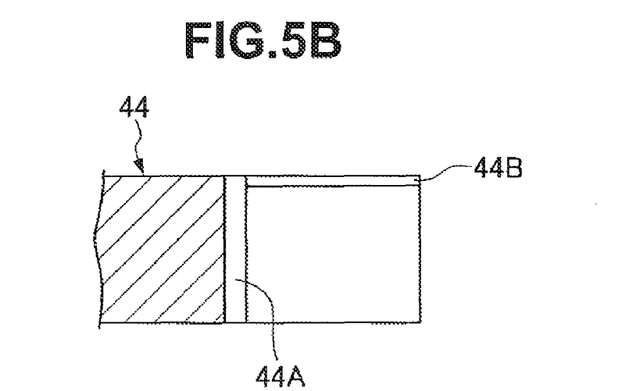
FIG. 5B is a cross sectional view along a line B-B in FIG. 5A.
Figure 5C:
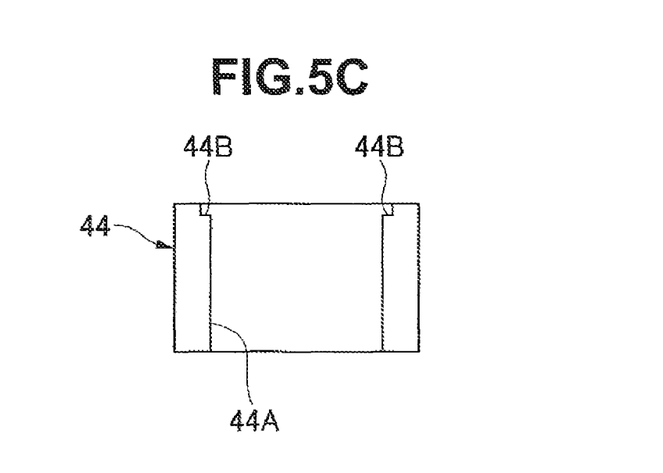
FIG. 5C is a side elevational view of FIG. 5A.

The resin sheet set means 40 sets the resin sheet 2 to the resin sheet set hole 12 of the set mold 10. The resin sheet set means 40 is installed in the other side of the first station 101, as shown in FIGS. 1 to 5C. The resin sheet set means 40 holds the laminated body 3 of the resin sheet 2 so as to freely move down along a vertical holding rod 41 inserted to the center hole 2A of the resin sheet 2. A hollow weight 42 is inserted to the vertical holding rod 41, and the weight 42 pressurizes the resin sheet 2 in a top end portion of the laminated body 3 toward a lower side. In the periphery of a lower end portion of the vertical holding rod 41, there is installed a holding frame 43 surrounding and holding the laminated body 3 in a bottom end portion side. The resin sheet set means 40 is structured such that a resin sheet cutting device 44 is arranged in a lower side of the vertical holding rod 41 and the holding frame 43. The resin sheet cutting device 44 can hold only one resin sheet 2 in the bottom end portion of the laminated body 3 held by the holding frame 43 so as to cut to an outer side from the bottom end portion of the laminated body 3. The resin sheet cutting device 44 is structured, as shown in FIGS. 5A to 5C, such that a cutting hole 44A capable of cutting the resin sheet 2 is open along a line from an upper surface to a lower surface, and narrow cutting grooves 44B capable of accommodating both facing side edge portions in an outer edge of one resin sheet 2 in both side portions of the cutting hole 44A in an upper surface. A depth of the cutting groove 44B corresponds to a thickness of one resin sheet 2, and makes a facing interval between both the cutting grooves 44B slightly larger than an outer diameter of the resin sheet 2. A cutting cylinder 45 is coupled to the resin sheet cutting device 44, and the cutting cylinder 45 reciprocates the resin sheet cutting device 44 between a cutting start position in a lower side of the holding frame 43, and a cutting end position in an upper portion of the set mold 10 positioned in the first station 101. At this time, the upper surface of the resin sheet cutting device 44 slidably moves in such a manner as to cut a lower end surface of the holding frame 43. A resin sheet pressing device 46 is arranged in an upper side of the resin sheet cutting device 44 positioned in the cutting end position. A pressing a cylinder 47 is coupled to the resin sheet pressing device 46, and the pressing cylinder 47 inserts the resin sheet pressing device 46 to the cutting hole 44A of the resin sheet cutting device 44 from the upper side of the resin sheet cutting device 44 and presses one resin sheet 2 held and cut by the cutting groove 44B to the resin sheet set hole 12 of the set mold 10 from the cutting hole 44A. The vertical holding rod 41, the holding frame 43, the cutting cylinder 45 and the pressing cylinder 47 are supported to the pedestal 100A.

The piston raw material pressing means 50 is structured, as shown in FIGS. 6 to 9, such that a pressing rod 51 is arranged in a lower side of the set mold 10 positioned in the second station 102, and the pressing rod 51 is moved up and down by a pressing cylinder (not shown). An aligning guide 52 is attached to and detached from an upper end portion of the pressing rod 51. The aligning guide 52 is provided with a center shaft 52A inserted and fixed to the upper end portion of the pressing rod 51, an expanded portion in an upper portion of the center shaft 52A is formed as a boss 52B brought into contact with the lower end surface of the piston raw material 1, and an aligning portion 52C in an upper portion of the boss 52B can be fitted to an inner diameter of the piston raw material 1.

The piston raw material pressing means 50 is additionally provided with a resin sheet presser foot 53. The resin sheet presser foot 53 corresponds to a cylindrical pressing member having an inner diameter which is larger than a dimension obtained by adding twice of a thickness t of the resin sheet 2 to an outer diameter C of the piston raw material 1. The resin sheet presser foot 53 is guided by a slide guide 54 supported to the pedestal 100A, movable up and down with respect to the resin sheet set hole 12 of the set mold 10 by a pressing cylinder (not shown), and is moved up and down between a descending position pressing an outer edge of the resin sheet 2 set to the resin sheet set hole 12 of the set mold 10, and a standby position spaced from the resin sheet set hole 12.

In other words, the pressing rod 51 of the piston raw material pressing means 50 is provided in such a manner as to freely reciprocate on a center axis of the lower opening 13, the piston set hole 11 and the resin sheet set hole 12 from the lower side of the set mold 10, and is provided with the aligning guide 52 capable of fitting to the inner diameter of the piston raw material 1 set to the piston set hole 11 of the set mold 10 in an upper end portion of the pressing rod 51. Accordingly, the pressing rod 51 of the piston raw material pressing means 50 presses the piston raw material 1 aligned by the aligning guide 52 to the resin sheet 2 set to the resin sheet set hole 12 of the set hole 10 so as to be pressed and held in an outer edge by the resin sheet presser foot 53, and locks the inner diameter of the resin sheet 2 to the annular groove 1D in the resin sheet locking end portion 1C of the piston raw material 1. Subsequently, as well as canceling the pressing and holding of the outer edge of the resin sheet 2 by the resin sheet presser foot, 53, the pressing rod 51 of the piston raw material pressing means 50 passes the piston raw material 1 to which the resin sheet 2 is locked, through the inner periphery of the resin sheet presser foot 53 while keeping the aligned state by the aligning guide 52, and presses into the heating and cooling cylinder apparatus 60.

The heating and cooling cylinder apparatus 60 has continuously arranged heating cylinder 61 and cooling cylinder 62 in such a manner as to press the piston raw material 1 to which the resin sheet 2 is locked, by the piston raw material pressing means 50, as shown in FIGS. 6 to 9. The heating cylinder 61 is provided with a heating actuation portion 61A such as an electric heater or the like, and the cooling cylinder 62 is provided with a cooling actuation portion 62A such as a water jacket or the like.

Figure 10:
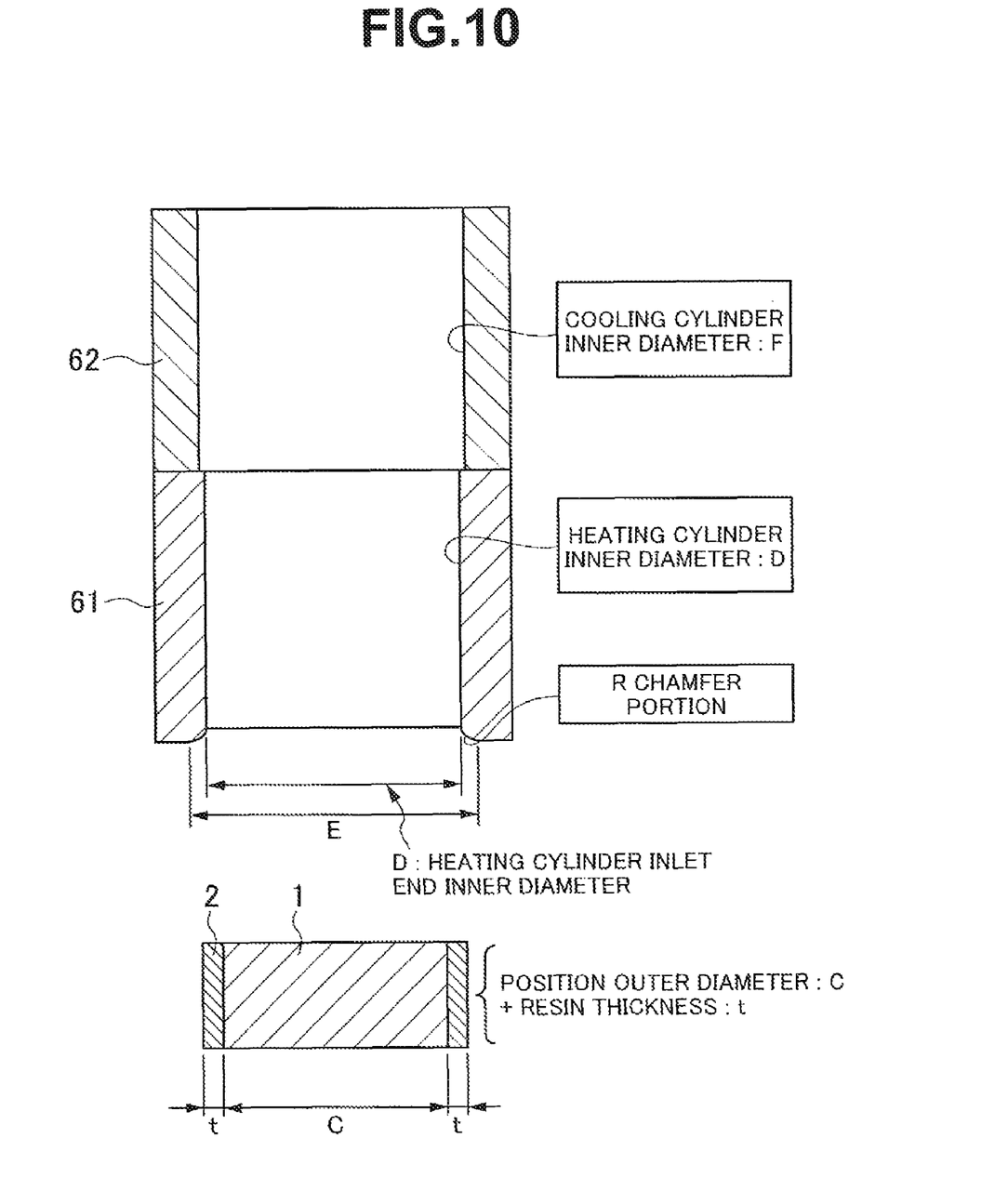
FIG. 10 is a view of a dimensional relationship between the heating and cooling cylinders and the piston raw material.

As shown in FIG. 10, in the heating and cooling cylinder apparatus 60, the heating cylinder 61 has an inlet end inner diameter D which is smaller than a dimension obtained by adding twice of the thickness t of the resin sheet 2 to the outer diameter C of the piston raw material 1, and an inner diameter E which is continuously provided from the inlet end via an R chamfer portion and is larger than the inner end inner diameter D.

Accordingly, the resin coated piston manufacturing apparatus 100 is operated as follows.

(1) The set mold 10 is positioned in the first station 101 ((1) in FIG. 1).

(2) The piston raw material 1 is set to the piston set hole 11 of the set mold 10 ((2) in FIG. 1). The piston raw material 1 slides down on the piston input chute 31 of the piston raw material set means 30 by its own weight so as to be accommodated in the piston set hole 11 of the set mold 10.

(3) The resin sheet 2 is set to the resin sheet set hole 12 of the set mold 10 ((3) in FIG. 1). The resin sheet 2 is cut on the set mold 10 by the resin sheet cutting device 44, and is pressed by the resin sheet pressing device 46 so as to be set to the resin sheet set hole 12 of the set mold 10.

(4) The set mold 10 is positioned in the second station 102 by the slide cylinder 22 ((4) in FIG. 1).

Figure 6:
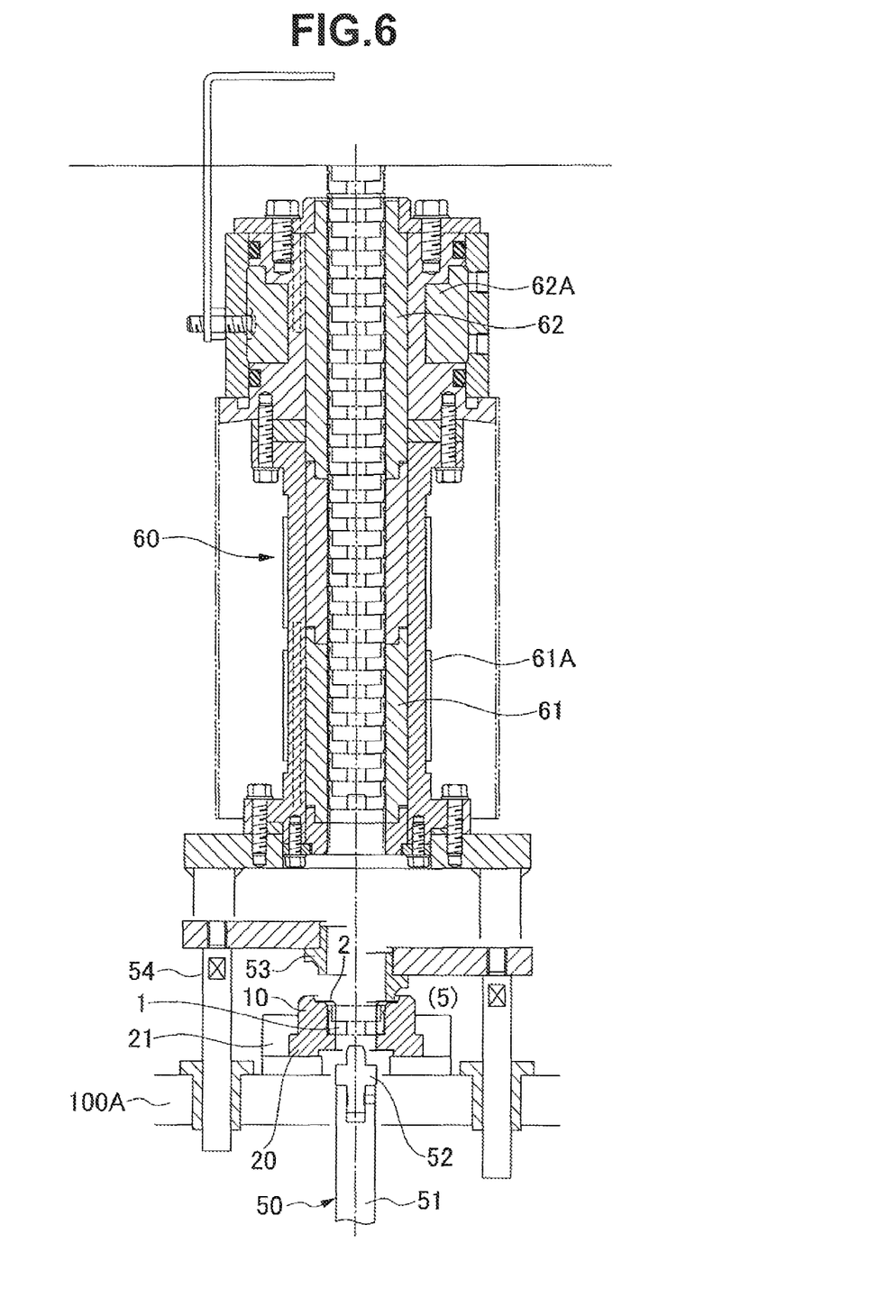
FIG. 6 is a schematic front elevational view showing a first half step of a piston raw material pressing means and heating and cooling cylinders.

(5) The outer edge of the resin sheet 2 set to the resin sheet set hole 12 of the set mold 10 is pressed by the resin sheet presser foot 53 ((5) in FIG. 6).

Figure 8:
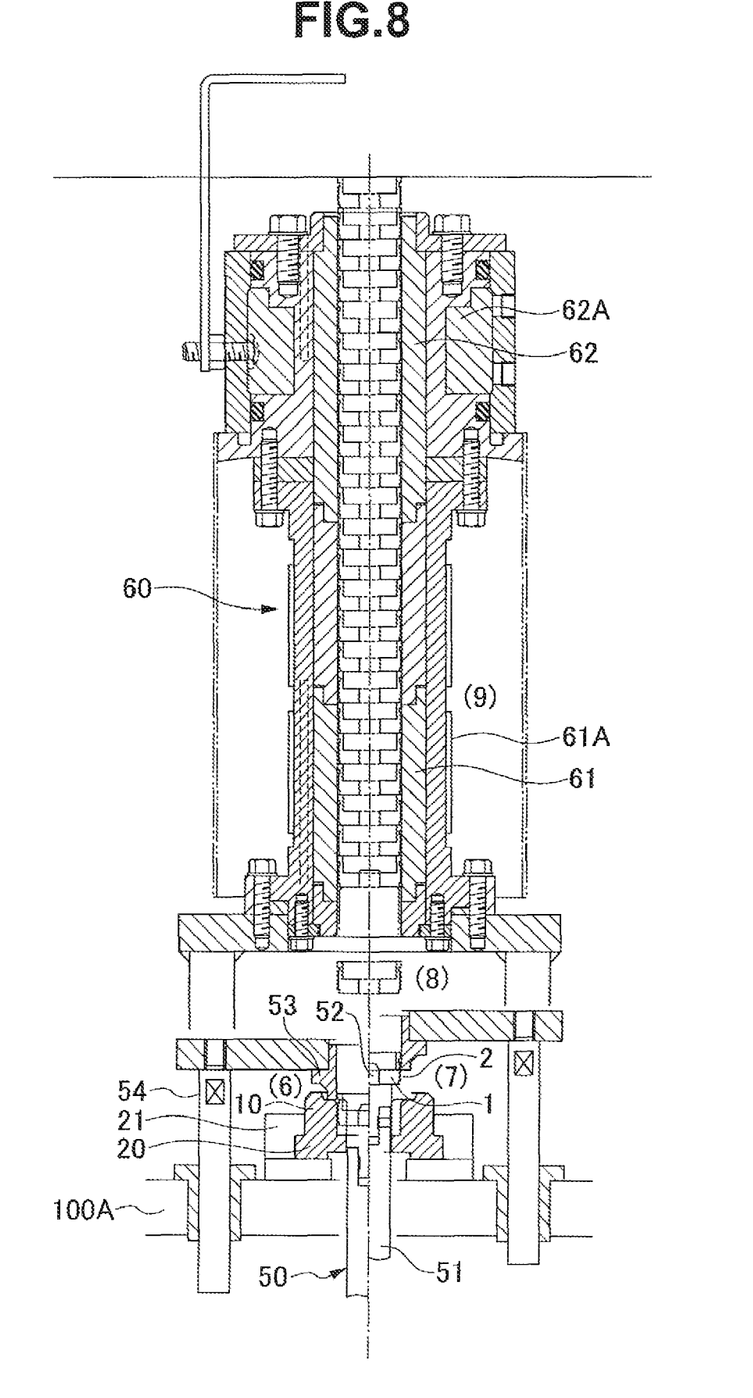
FIG. 8 is a schematic front elevational view showing a second half step of the piston raw material pressing means and the heating and cooling cylinders.
Figure 9:
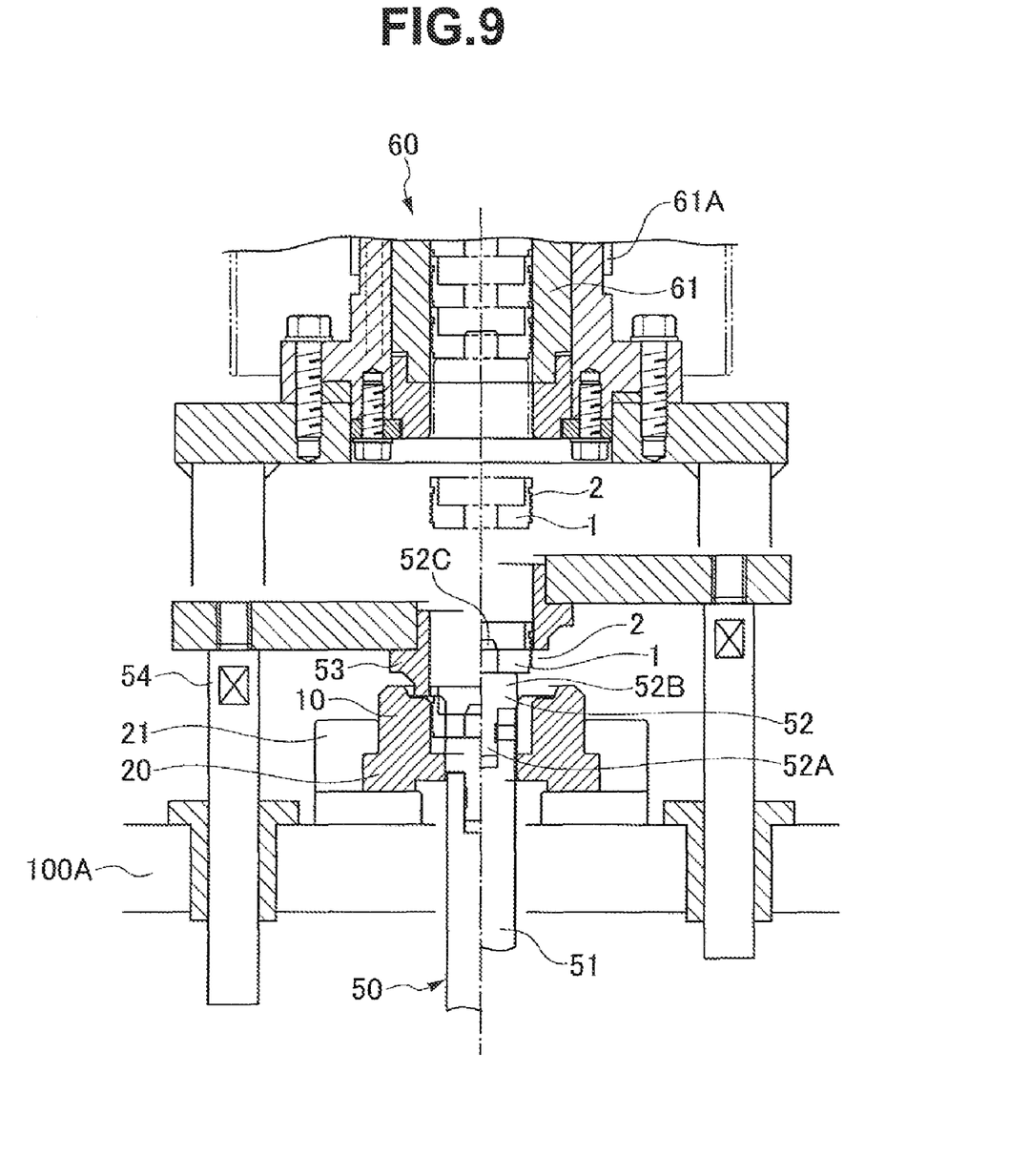
FIG. 9 is an enlarged view of a main portion of FIG. 8.

(6) The piston raw material 1 aligned by the aligning guide 52 is pushed up by the pressing rod 51 of the piston raw material pressing means 50, and the inner diameter of the resin sheet 2 is locked to the annular groove 1D in the resin sheet locking end portion 1C of the piston raw material 1 ((6) in FIG. 8).

(7) The pressing of the outer edge of the resin sheet 2 by the resin sheet presser foot 53 is cancelled ((7) in FIG. 8).

(8) The piston raw material 1 to which the resin sheet 2 is locked is pressed out from the set mold 10 by the piston raw material pressing means 50 so as to be passed through the inner diameter of the resin sheet presser foot 53, the resin sheet 2 is temporarily wiped so as to be copied along the outer periphery of the piston raw material 1, and the piston raw material 1 and the resin sheet 2 are continuously pressed into the heating cylinder 61 and the cooling cylinder 62 of the heating and cooling cylinder apparatus 60 ((8) in FIG. 8).

After the piston raw material pressing means 50 presses the piston raw material 1 out of the set mold 10, the set mold 10 is switched and set from the second station 102 to the first station 101 by the slide cylinder 22. The side opening 14 of the set mold 10 cuts across the pressing rod 51 of the piston raw material pressing means 50 so as to be movable in the horizontal direction.

(9) Since the piston raw material 1 and the resin sheet 2 are continuously pressed into the heating and cooling cylinder apparatus 60 by the piston raw material pressing means 50, the resin sheet 2 is engaged with the annular groove 1B of the piston raw material 1, and is fixed ((9) in FIG. 4).

In accordance with the present embodiment, the following operations and effects can be achieved.

(a) Since the resin sheet 2 is set to the resin sheet set hole 12 on the piston raw material 1 set to the piston set hole 11 of the set mold 10, it is not necessary that the set mold 10 is provided with the aligning guide 52 to which the inner diameter of the piston raw material 1 can be fitted. Since the piston raw material 1 is simply input to the piston set hole 11 of the set mold 10, it is possible to simplify the piston raw material set means 30.

(b) Since the resin sheet 2 is set to the resin sheet set hole 12 on the piston raw material 1 set to the piston set hole 11 of the set mold 10, it is possible to simultaneously execute a step of setting the piston raw material 1 to the set mold 10 and a step of setting the resin sheet 2 to the set mold 10, on the basis of the provision of the piston input port 11A in the side portion of the piston set hole 11 of the set mold 10 or the like, so that it is possible to shorten the manufacturing time.

(c) Since there are unified the means (the piston raw material pressing means 50) for locking the resin sheet 2 to the resin sheet locking annular groove 1D of the piston raw material 1 by pressing the piston raw material 1 to the resin sheet 2, and the means (the piston raw material pressing means 50) for pressing the piston raw material 1 to which the resin sheet 2 is locked, to the heating and cooling cylinder apparatus 60, it is possible to simplify the manufacturing apparatus.

(d) Since there are unified the means (the piston raw material pressing means 50) for locking the resin sheet 2 to the resin sheet locking annular groove 1D of the piston raw material 1 by pressing the piston raw material 1 to the resin sheet 2, and the means (the piston raw material pressing means 50) for pressing the piston raw material 1 to which the resin sheet 2 is locked, to the heating and cooling cylinder apparatus 60, it is possible to continuously execute a step of pressing the piston raw material 1 so as to lock the resin sheet 2 to the resin sheet locking annular groove 1D, and a step of pressing the piston raw material 1 to which the resin sheet 2 is locked, to the heating and cooling cylinder apparatus 60, by the single piston raw material pressing means 50, and it is possible to shorten the manufacturing time.

(e) Since the single piston raw material pressing means 50 is structured such as to be provided with the aligning guide 52 capable of fitting to the inner diameter of the piston raw material 1, it is possible to lock the resin sheet locking annular groove 1D of the piston raw material 1 to the resin sheet 2 while centering, it is possible to subsequently press the piston raw material 1 to which the resin sheet 2 is locked, to the heating and cooling cylinder apparatus 60 while centering, and it is possible to smoothly and securely execute a step of pressing the piston raw material 1 so as to lock the resin sheet 2 to the resin sheet locking annular groove 1D of the piston raw material 1, and a step of pressing the piston raw material 1 to which the resin sheet 2 is locked, to the heating and cooling cylinder apparatus 60.

(f) Since the resin sheet 2 is pressed by the resin sheet presser foot 53 so as to be engaged with the piston raw material 1, and the piston raw material 1 and the resin sheet 2 pass through the inner periphery of the resin sheet presser foot 53, the resin sheet 2 is temporarily wiped, and is formed as the shape copying the outer periphery of the piston raw material 1, and it is possible to obtain the shape easily inserted to the heating and cooling cylinder apparatus 60.

(g) Since the means 40 for setting the resin sheet 2 to the resin sheet set hole 12 of the set mold 10 is structured such as to arrange the resin sheet cutting device 44 capable of holding only one resin sheet 2 so as to cut to the outer side from the bottom end portion of the laminated body 3 in the lower side of the vertical holding rod 41, and be provided with the resin sheet pressing device 46 pressing and setting the resin sheet 2 held and cut by the resin sheet cutting device 44 to the resin sheet set hole 12 of the set mold 10, it is possible to stably set only one resin sheet 2 to the set mold 10. Further, any special equipment such as a vacuum pump or the like is not required.

(h) Since the inner diameter of the cooling cylinder 62 is made larger than the inner diameter of the heating cylinder 61, it is possible to smoothly press the piston raw material 1 without the resin sheet 2 attached to the piston raw material 1 being caught on the boundary between the heating cylinder 62 and the cooling cylinder 61, at a time of pressing the piston raw material 1 to which the resin sheet 2 is locked, to the cooling cylinder 62 via the heating cylinder 61, and there is no risk that the resin sheet 2 hot formed within the heating cylinder 62 is damaged.

(i) It is possible to arrange the piston raw material set means 30, the resin sheet set means 40, the piston raw material pressing means 50 and the heating and cooling cylinder apparatus 60 on the slide table 20, it is possible to simultaneously actuate the piston raw material set means 30 and the resin sheet set means 40, and it is possible to continuously execute the step of pressing the piston raw material 1 by the piston raw material pressing means 50 so as to lock the resin sheet 2 to the resin sheet locking annular grove 1D of the piston raw material 1, and the step of pressing the piston raw material 1 to which the resin sheet, 2 is locked, to the heating and cooling cylinder apparatus 60. Accordingly, it is possible to shorten the manufacturing time, and it is possible to make the manufacturing apparatus compact.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to several exemplary embodiments thereof it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A resin coated piston manufacturing apparatus for a shock absorber in which a washer-shaped resin sheet is adhered to an outer periphery of a cylindrical piston raw material having a plurality of annular grooves in an outer periphery, comprising:
    a set mold coaxially provided with a piston set hole and a resin sheet set hole;
    a means for setting the piston raw material within the piston set hole of the set mold;
    a means for setting the resin sheet within the resin sheet set hole of the set mold;
    a means for pressing the piston raw material to the resin sheet including an axially reciprocating on a center axis of the set mold resin sheet presser foot provided at an upper portion of the set mold pressing an outer periphery of the resin sheet, the outer periphery of the resin sheet is pressed by the resin sheet presser foot at a time of locking the resin sheet by axial displacement of the piston raw material through a hole of the resin sheet until the resin sheet is locked to a resin sheet locking annular groove of the piston raw material; the outer periphery of the resin sheet is released after the locking, and the piston raw material to which the resin sheet is locked passes axially through an inner periphery of the resin sheet presser foot so as to be pressed into continuously arranged heating and cooling cylinder apparatuses in such a manner as to press the piston raw material to which the resin sheet is locked,
    the means for pressing the piston raw material is provided so as to freely reciprocate on a center axis of the set mold, is provided with an aligning guide capable of being fitted to an inner diameter of the piston raw material set to the piston set hole of the set mold, presses the piston raw material to the resin sheet so as to lock the resin sheet to the resin sheet locking annular groove of the piston raw material, and is capable of pressing the piston raw material to which the resin sheet is locked, to the heating and cooling cylinder apparatuses;
    wherein a heating cylinder of the heating and cooling cylinder apparatuses has an inlet end inner diameter (D) which is smaller than a dimension obtained by adding twice of a thickness of the resin sheet to an outer diameter of the piston raw material, and a heating cylinder inner diameter (E) which is continuously provided from the inlet end via an R chamfer portion and is smaller than the inlet end inner diameter (D); and
    a cooling cylinder of the heating and cooling cylinder apparatuses has an inner diameter which is larger than the heating cylinder inner diameter (E).

2. A resin coated piston manufacturing apparatus for a shock absorber as claimed in claim 1, wherein a laminated body of the washer-shaped resin sheet is held so as to freely move down along a vertical holding rod inserted to a center hole of the resin sheet,
    a resin sheet cutting device is arranged in a lower side of the vertical holding rod, the resin sheet cutting device being capable of holding only one resin sheet in a bottom end portion of the laminated body so as to cut to an outer side from the bottom end portion of the laminated body, and
    the resin coated piston manufacturing apparatus is provided with a resin sheet pressing device for pressing and setting the resin sheet held to the resin sheet cutting device so as to be cut to a resin sheet set hole of the set mold.

3. A resin coated piston manufacturing apparatus for a shock absorber as claimed in claim 1, wherein the set mold is provided on a slide table, the piston raw material set means, the resin sheet set means, the piston raw material pressing means and the heating and cooling cylinder apparatuses are arranged along the slide table, and the resin coated piston manufacturing apparatus has a control apparatus for controlling in such a manner as to actuate the slide table, the piston raw material set means, the resin sheet set means, the piston raw material pressing means and the heating and cooling cylinder apparatuses.

4. A resin coated piston manufacturing apparatus for a shock absorber as claimed in claim 2, wherein the set mold is provided on a slide table, the piston raw material set means, the resin sheet set means, the piston raw material pressing means and the heating and cooling cylinder apparatuses are arranged along the slide table, and the resin coated piston manufacturing apparatus has a control apparatus for controlling in such a manner as to actuate the slide table, the piston raw material set means, the resin sheet set means, the piston raw material pressing means and the heating and cooling cylinder apparatuses.

5. A resin coated piston manufacturing apparatus for a shock absorber as claimed in claim 1, wherein the set mold is provided on a slide table, the piston raw material set means, the resin sheet set means, the piston raw material pressing means and the heating and cooling cylinder apparatuses are arranged along the slide table, and the resin coated piston manufacturing apparatus has a control apparatus for controlling in such a manner as to actuate the slide table, the piston raw material set means, the resin sheet set means, the piston raw material pressing means and the heating and cooling cylinder apparatuses.

6. A resin coated piston manufacturing apparatus for a shock absorber as claimed in claim 3, wherein the slide table to which the set mold is fixed is supported to the slide guide, the set mold is moved together with the slide table by a slide cylinder coupled to the slide table, and the set mold is capable of being switched to each of a first station and a second station installed on the moving path of the slide table, the piston raw material set means is arranged in one side of the first station, and the resin sheet set means is arranged in the other side of the first station, and the piston raw material pressing means and the heating and cooling cylinder apparatuses are coaxially arranged in upper and lower sides of the second station.

7. A resin coated piston manufacturing apparatus for a shock absorber as claimed in claim 6, wherein the first station is installed at each of two positions spaced from the second station on the moving path of the slide table, the set mold is fixed to each of two positions spaced at a distance between each of the first stations and the second station, at two positions along the moving path of the slide table on the slide table, and the resin coated pistons are manufactured alternately from the piston raw materials and the resin sheets set in the respective set molds.

* * * * *